United States Patent
Fishman et al.

(10) Patent No.: US 6,330,375 B1
(45) Date of Patent: Dec. 11, 2001

(54) DISTORTION ANALYZER FOR COMPENSATION APPARATUS OF FIRST ORDER POLARIZATION MODE DISPERSION (PMD)

(75) Inventors: Daniel A. Fishman, Lakewood, NJ (US); Fred L. Heismann, Boca Raton, FL (US); David L. Wilson, Little Silver, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/465,152

(22) Filed: Dec. 16, 1999

(51) Int. Cl.[7] ....................................... G02B 6/00
(52) U.S. Cl. ............... 385/11; 385/28; 359/156; 359/161; 359/122; 359/140
(58) Field of Search ................. 385/11, 29, 123, 385/28, 24; 359/156, 161, 122, 140

(56) References Cited

U.S. PATENT DOCUMENTS

| | | | |
|---|---|---|---|
| 5,473,457 | * 12/1995 | Ono | 359/122 |
| 5,930,414 | * 7/1999 | Fishman et al. | 385/11 |
| 6,130,766 | * 10/2000 | Cao | 359/122 |

* cited by examiner

Primary Examiner—Darren Schuberg
Assistant Examiner—Fayez Assaf
(74) Attorney, Agent, or Firm—Steve Mendelsohn

(57) ABSTRACT

The effect of polarization mode dispersion that an optical signal experiences as it propagates through an optical transmission fiber is compensated for at a receiver using a birefringent compensator, in which a distortion analyzer repeatedly examines the signal outputted by the compensator and causes the compensator to reduce the effect of such polarization mode dispersion based on the results of such examination.

18 Claims, 3 Drawing Sheets

DISTORTION ANALYZER FOR COMPENSATION APPARATUS OF FIRST ORDER POLARIZATION MODE DISPERSION (PMD)

FIELD OF THE INVENTION

The invention relates to optical transmission systems and more particularly relates to dealing with so-called polarization mode dispersion in such systems.

BACKGROUND OF THE INVENTION

Polarization Mode Dispersion (PMD) occurs in an optical fiber as a result of a small residual birefringence that is introduced in the fiber core by asymmetric internal stress as well as random polarization coupling due to external forces acting upon the fiber. It is well-known that PMD may severely impair the transmission of a signal in an optical fiber network. This is especially the case in modern digital lightwave systems that operate at bit rates of at least 10 Gb/s per transmitted wavelength channel.

U.S. Pat. No. 5,930,414, which issued Jul. 27, 1999 to D. A. Fishman et al, discloses different apparatus for mitigating signal impairments due to PMD. Such apparatus employs a variable optical birefringence element which introduces a differential optical time delay between at least two selectable mutually orthogonal polarization states, i.e., the "Principal States of Polarization" (PSP) in the transmission fiber. An optical distortion analyzer coupled to the output of the variable birefringence element generates a control signal for that element.

The compensation apparatus shown in FIG. 4 of the referenced '414 patent generates a continuously variable Differential Group Delay (DGD) between two principal states of polarization to compensate for first-order PMD in the transmission fiber. One difference between this arrangement and the time-delay line shown in FIG. 1 of the referenced '414 patent is that the PSPs of the variable birefringence element in the apparatus of FIG. 4 of the '414 patent is frequency dependent. Such frequency dependence (which is an important aspect of a so-called second-order PMD effect) may lead to excessive distortion in the optical signal, since the first-order PMD in the fiber can only be compensated for over a certain optical bandwidth. Moreover, the PMD may even increase in certain parts of the optical spectrum.

Signal distortion caused by the second-order PMD effect in conventional non-return-to-zero (NRZ) and return-to-zero (RZ) digital optical signals may be observed in the electrical spectrum of the received optical signal as a narrowband "tone" of spectral energy at the certain frequencies related to the signal bit rate, e.g., 10 GHz for NRZ and 20 GHz for RZ signals.

SUMMARY OF THE INVENTION

We decrease substantially the distortion caused by second-order PMD effects in a variable birefringence element of PMD compensation apparatus by modifying the control signal applied to the variable birefringence element such that the optical signal experiences minimal second-order PMD. In particular, the control signal generated by the distortion analyzer of FIG. 2 or 8 of the above-referenced '414 patent is modified by subtracting from the control signal in a weighted fashion the output signal of a bandpass filter tuned to the narrowband tone outputted by the distortion analyzer. The resulting modified signal, $V_f$, is then supplied to the polarization controllers in the variable birefringence element to reduce the level of the distortion that occurs as result of the aforementioned second order effect. The modified $V_f$, more particularly, causes the PMD compensator to operate at a point where the overall second-order distortions in both the transmission fiber and PMD compensator are minimal. The inventive feature particularly orients the PSPs of the compensator to offset any second-order PMD distortion that may be generated by the transmission fiber. That is, the second-order effect is subtracted from, rather than added to, the distortion produced by the transmission fiber.

These and other aspects of our invention are set forth in the following detailed description, corresponding drawings and ensuing claims.

DETAILED DESCRIPTION

For the sake of clarity and continuity the inventive feature will be discussed in the context of the compensation system disclosed in the aforementioned U.S. Pat. No. 5,930,414, which is hereby incorporated by reference.

Polarization Mode Dispersion (PMD) occurs in single-mode fibers as a result of residual birefringence in the fiber core and coupling of random polarization at various points along the fiber.

It is well-known that for any optical frequency, $\omega = \omega_0$, there exist two orthogonal states of polarization commonly referred to as the Principal States of Polarization (PSP). An optical signal propagating through a fiber does not experience any significant amount of differential time delay if it is polarized at one of the two PSPs.

It can be appreciated that a differential group delay, $\tau_f$, occurs between the two PSPs of the fiber. The differential group delay (DGD) which an optical signal experiences as a result of propagating through an optical fiber may be compensated for by introducing an opposite but equal amount of differential time delay, $\tau_c = -\tau_f$, at the output of the fiber. This may be readily done using an optical element having the polarization characteristics disclosed in the aforementioned patent.

PMD in a fiber may change with time and/or with changes in optical frequency. A change in PMD may include changes in the corresponding PSPs as well as changes in DGD, $\tau_f$, which may be compensated for by varying the amount and orientation of the birefringence in the compensator to adaptively compensate for the DGD in the fiber. An adaptive, variable-birefringence compensator may be readily realized by disposing a polarization transformer, for example, the polarization transformer described in U.S. Pat. No. 5,212,743 issued May 18, 1993 to F. L. Heismann, which is hereby incorporated by reference herein, in series with an element that generates variable linear birefringence. Such variable birefringence may be generated by splitting the signal at the output of the polarization transformer into two orthogonal linear polarization states corresponding to the two PSPs of the fiber, and delaying one of the two polarization states by a variable amount of time, $\tau_c$, using a respective time delay line 50 (such as, for example, the polarization mode dispersion emulator, model PE3 available from JDS Fitel Inc.) as shown in FIG. 1 of the above referenced '414 patent.

Figure 1:
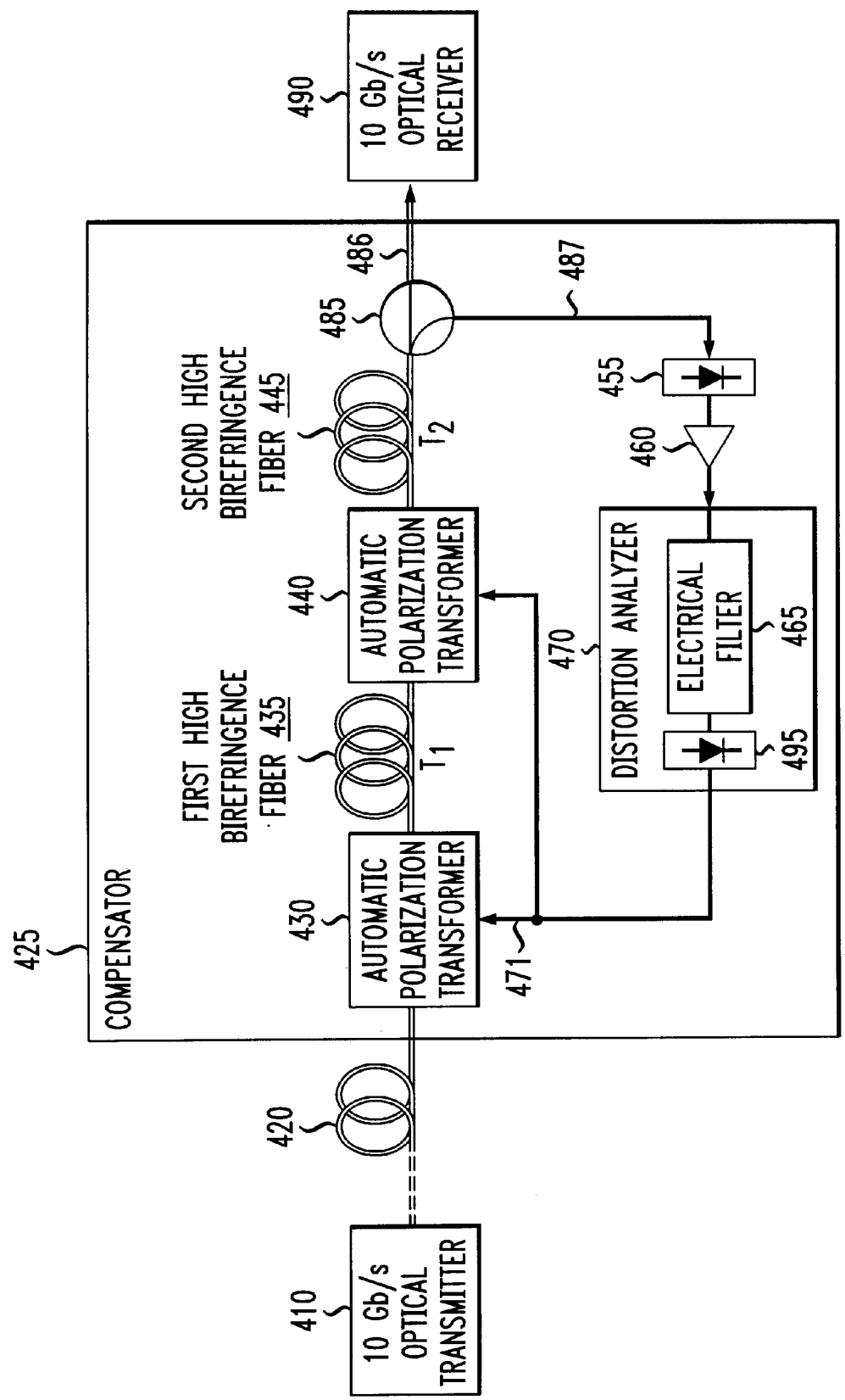
FIG. 1 illustrates in block diagram form an illustrative prior art system in which the principles of the invention may be practiced.

Another way of generating such birefringence is illustrated in FIG. 1. This embodiment includes two nearly identical sections of high birefringence single-mode fibers 435 and 445 which generate fixed differential time delays, $\tau_1$ and $\tau_2$, respectively between light signals polarized along the slow and fast optical axis of the two fibers. (Fibers 435 and 445 may be, for example, the SM15-P-8/125 fiber available from Fujikura Co., having a time delay of about 1.4 ps/m.) A second polarization transformer 440 inserted between fibers 435 and 445 effectively controls the angle, $\theta_c$, between the fast axis of fiber 435 and fiber 445. The resulting differential time delay, $\tau_c$, generated by fibers 435 and 445 may be expressed as follows:

$$\tau_c = \sqrt{\tau_1^2 + \tau_2^2 + 2\tau_1\tau_2 \cos(2\theta_2)}$$

which is continuously variable between a minimum value of $|\tau_1-\tau_2|$ and a maximum value of $(\tau_1+\tau_2)$.

If the polarization transformation generated in polarization transformer 430 and the differential time delay generated by fibers 435 and 445 and polarization transformer 440 are properly adjusted in the manner described in the aforementioned '414 patent, then a signal outputted by compensator 425 will be free of the distortions caused by differential group delays occurring in transmission fiber 420.

A feedback signal is used to control the polarization transformation in polarization transformer 430 (i.e., the orientation of the variable birefringence) as well as the variable differential time delay generated by the two high birefringence fibers 435 and 445 and polarization transformer 440. The desired feedback signal may be generated at the output of compensator 425 by monitoring the amount of pulse distortion that is due to the differential time delay present in an optical signal after it has traveled through compensator 425.

Note that only one feedback signal 471 is needed to simultaneously adjust the polarization transformation and adjust the differential delay, $\tau_c$, to achieve minimal distortion in the signal that compensator 425 outputs to optical receiver 490 via conventional signal tap 485, as is shown in FIG. 1 and as will be discussed below.

Specifically, a portion of the signal that compensator 425 outputs is supplied via optical tap 485 to path 487 extending to high-speed photodetector 455, which may be, for example the Hewlett Packard Co., model 11982 Wideband Lightwave Converter having an electrical bandwidth that is at least equal to the information bandwidth of the modulated optical signal transmitted by optical transmitter 410. The remainder of the signal is supplied to path 486 extending to receiver 490. Photodetector 455 converts the high-speed digital information signal that was modulated onto an optical carrier signal into an electrical signal. The electrical signal is then amplified by conventional amplifier 460 and coupled to electrical distortion analyzer 470, which measures the distortion in the amplified photocurrent and converts the amplified result into a voltage, $V_f$ supplied to path 471, that is proportional to the distortion. For example, voltage $V_f$ reaches a maximum value when the optical signal is free of distortion due to first order PMD, i.e., when the combined differential time delay of optical fiber 420 and compensator 425 is substantially equal to zero.

If the DGD in the transmission fiber is limited to values below a maximum value, $\tau_{max}$, then the distortion in the optical signal may be quantified by simply measuring the amplitude of the received electrical signal of a particular frequency $f \leq 1/(2\tau_{max})$. The amplitude of this signal may then be used as a feedback signal to automatically adjust the orientation and level of DGD that is generated in PMD compensator 425, such that the feedback signal is maximized.

The above requirement set for the total DGD that may be inserted in a transmission system, $\tau_{total} \leq \tau_{max}$, may limit the amount of DGD that may be compensated for in an optical transmission fiber, $\tau_f$, as $\tau_{total} \leq 2\tau_f$. For example, if in a 10 Gbps digital transmission system, the amplitude of the received electrical signal is measured at 5 GHz, then $\tau_f$ should always be smaller that 50 ps. Otherwise, the feedback signal that is generated as a function of the amplitude of the 5 GHz component may be ambiguous in the sense that it is difficult to determine by which amount and direction the polarization transformation and the differential time delay, $\tau_c$, need to be adjusted to obtain a $\tau_{total}=0$, which may occur, for example, when the amplitude of the feedback signal is the same for two different values of $\tau_{total}$, and which may result in generating faulty adjustments in the orientation and level of the differential time delay in PMD compensator 425.

An "unambiguous" feedback signal (i.e., a signal that is a unique measure of $\tau_{total}$) may be generated, without limiting the level of compensation that may be applied to DGD, by measuring the amplitude of a plurality of frequency components contained in the optical information signal propagating through an optical fiber. An illustrative embodiment of a compensator, which analyzes the amplitudes of substantially the entire received electrical frequency spectrum using a broadband electrical power detector, is shown in FIG. 1. The broadband electrical power detector 495, which may be, for example, model 8474 diode detector available from the Hewlett Packard Co., more particularly, converts such amplitudes into a single feedback voltage, $V_f$, that is proportional to the integral of the amplitudes (power levels) of substantially the entire high-frequency electrical spectrum.

As mentioned above, the compensation arrangement illustrated in FIG. 1 generates a continuously variable Differential Group Delay (DGD) to compensate for first-order DGD. As also mentioned above, one difference between this compensation arrangement and the differential time-delay line shown in FIG. 1 of the aforementioned U.S. Pat. No. 5,930,414 is that the compensation section formed by high-birefringence fibers 435 and 445 and polarization transformer 440 of FIG. 1 herein exhibit Principal States of Polarization (PSPs) that vary strongly with optical frequency. Such frequency dependence (which is one aspect of a so-called second-order PMD effect) may distort the optical signal in the compensator, since the DGD experienced in the fiber can only be removed over a certain optical frequency range. Moreover, the DGD may even increase in certain parts of the spectrum.

We have found that for conventional intensity-modulated optical signals, the second-order PMD effect may be observed in the electrical domain by the appearance of a narrowband "tone" of spectral energy at the corresponding frequency of the signal bit rate, i.e., around 10 GHz for non-return-to-zero (NRZ) formatted digital signals at a bit rate 10 Gb/s and at 20 GHz for return-to-zero formatted signals at 10 Gb/s. Thus, the distortion caused by this second-order PMD effect may be observed using a distortion analyzer with an electrical filter of the type shown in FIGS.

2 and 8 of the above referenced '414 patent modified to have a bandpass characteristic at the bit-rate frequency.

Figure 2:
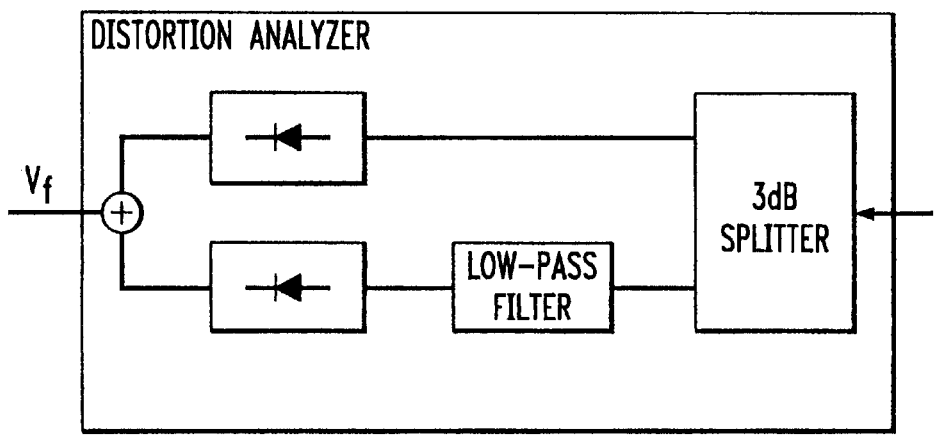
FIG. 2 is a block diagram of another illustrative distortion analyzer that may be used to derive a feedback signal for the PMD compensator of FIG. 1.

We have further found that the effects of distortion caused by second-order PMD may be dealt with by subtracting in a weighted fashion the output of a bandpass filter tuned to the narrowband tone from the signal outputted by the distortion analyzer of FIG. 2 (herein). The resulting modified signal, $V_f$, is then supplied to the compensator to reduce the level of the distortion that occurs as a result of the aforementioned second order PMD effect. The modified $V_f$, more particularly, causes the compensator to move to (dither) a point that centers the region of correct DGD and PSP alignment on the spectral region of maximal distortion in the optical signal, thereby reducing the effects of second-order PMD. The inventive enhancement also orients the PSPs of the compensator to offset any second-order PMD distortion that a signal may experience in the transmission fiber in such way that the second-order PMD generated in the compensator is subtracted from, rather than added to, the second-order PMD distortion experienced in the transmission fiber.

Figure 3:
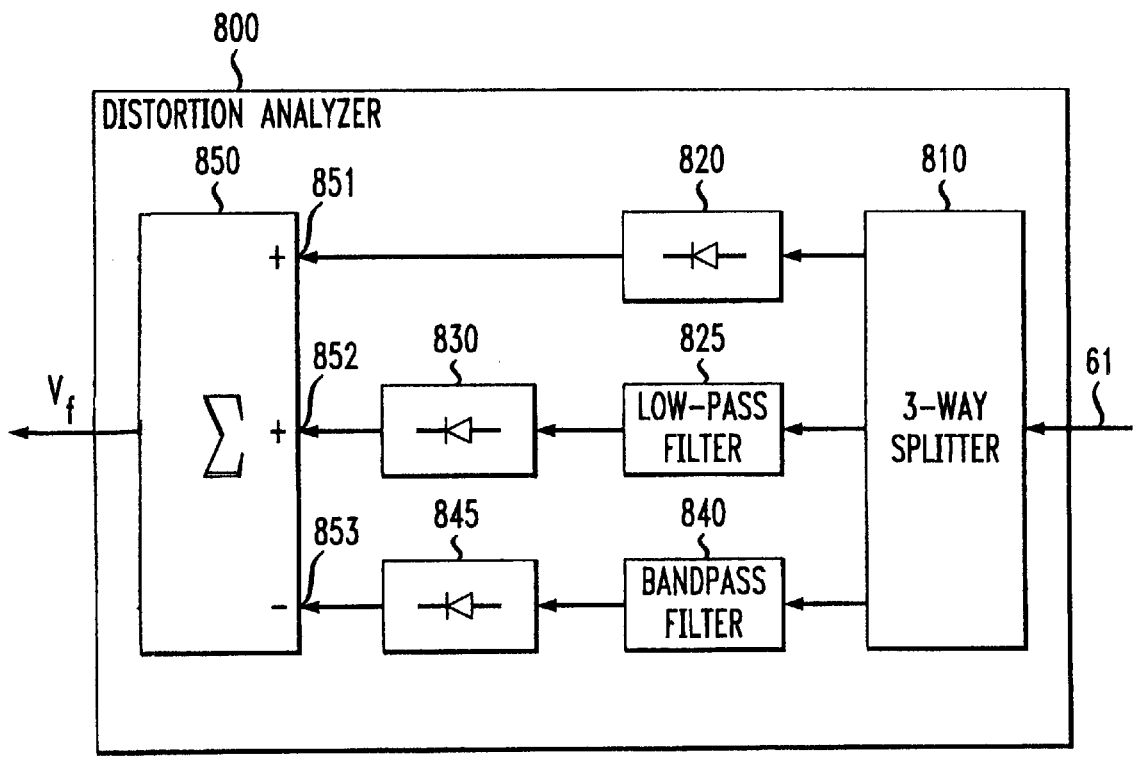
FIG. 3 is a block diagram of an improved distortion analyzer.

FIG. 3 shows one illustrative embodiment of a modified distortion analyzer that generates the aforementioned modified control signal $V_f$ in which amplifier 460 supplies an amplified electrical signal to the distortion analyzer, as mentioned above. Conventional 3-way splitter 810 splits the amplified signal into three signals that are respectively supplied to broadband power detector 820, low-pass filter 825 and bandpass filter 840. Detector 820 in a conventional manner passes a signal (e.g., a voltage level proportional to the power in the entire frequency spectrum of the signal) to adder port 851 of conventional summing circuit 850. Low-pass filter 825, on the other hand, filters the electrical signal allowing only that portion of the frequency spectrum below, e.g., 2.5 GHz, to pass through to detector 830. The signal exiting detector 830 is then presented to adder port 852 of summing circuit 850. Bandpass filter 840, more particularly, filters the signal that it receives from 3-way splitter 810 and passes only those signals within a predetermined spectrum of signals, e.g., a one GHz band centered about 10 GHz. The signal exiting filter 840 is then supplied via detector 845 to negative port 853 of summing circuit 850. Summing circuit 850, in a conventional manner, subtracts the signal that it receives via port 853 from the sum of the signals that it receives via ports 851 and 852. The distortion analyzer thus outputs a feedback signal, $V_f$, which negatively emphasizes the spectrum around the predetermined spectrum of signals, e.g., around 10 GHz. Such emphasis causes the compensator, e.g. compensator 425 of FIG. 1, to adapt in the aforementioned dithered manner to substantially eliminate the frequency tones that occur as a result of the second-order PMD effect, all in accordance with an aspect of the invention.

The feedback voltage, $V_F$, expressed by equation (9) shown in the aforementioned U.S. Pat. No. 5,930,414 as well as the modified feedback voltage, $V_f$, generated by the distortion analyzer of FIG. 3, may be reduced by the presence of polarization-dependent loss (PDL) that is generated in PMD compensator 425 (e.g., in the polarization transformers). The feedback voltage, $V_f$, is derived from two stages of square-law detection (i.e., optical-to-RF, and RF-to-low frequency), and, therefore, is proportional to the square of the total received optical power. We have recognized that dividing the feedback voltage by the square of the average optical power received by photodetector 455 decreases substantially the adverse effects of polarization-dependent loss in compensator 425 and, therefore, creates a higher level of PMD compensation.

Figure 4:
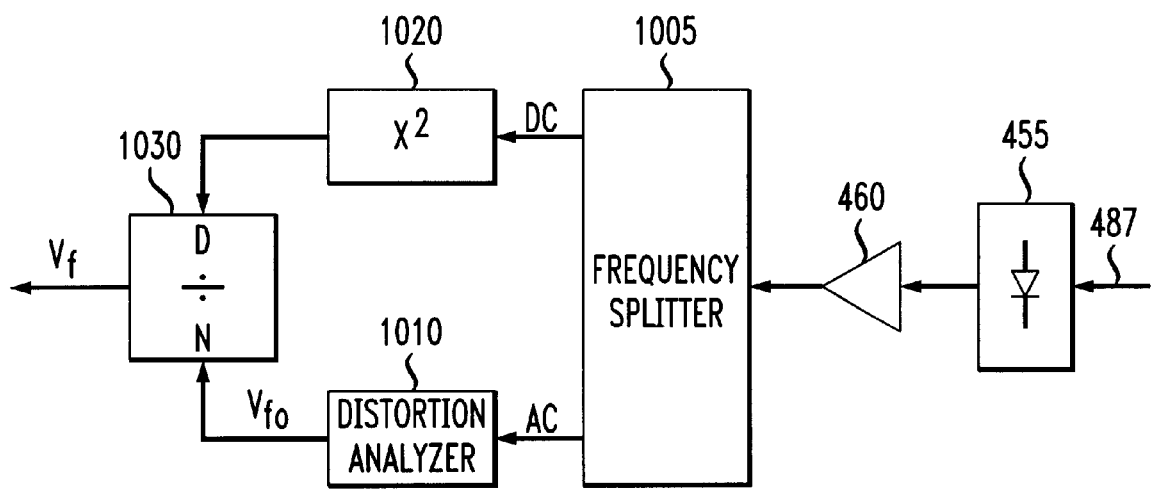
FIG. 4 is a block diagram of another improved distortion analyzer.

Such precision may be achieved, in accordance with an aspect of the invention, by using the illustrative circuit arrangement shown in FIG. 4, in which frequency splitter 1005 in a conventional manner separates the electrical signal outputted by high-speed photodetector 455 (also shown in FIG. 1) into high-frequency (AC) and low-frequency (DC) components. In an illustrative embodiment of the invention, splitter 1005 may be formed from, for example, one or more conventional transimpedance LC circuits. The high frequency components, which contain information relating to the distortion in the high-speed digital signals are, after optional amplification, supplied to distortion analyzer 1010, which may be, for example, either the distortion analyzer of FIG. 2 or 3. The low frequency (DC) components, having levels proportional to the average received optical power, are supplied to conventional analog squaring circuit 1020. (In an illustrative embodiment of the invention, squarer 1020 may be, for example, an analog multiplier having two inputs connected together.) The signal at the output of squarer 1020 is then supplied to the denominator terminal, D, of conventional analog divider 1030. The feedback voltage, $V_{fo}$, from distortion analyzer 1010 is supplied to the numerator terminal (N) of divider circuit 1030. The resultant quotient is then supplied at the output of divider 1030 as the feedback signal, $V_f$, which has been normalized by the received optical power to remove the effects of optical power fluctuations due to PDL.

A reduction in response to undesired polarization-dependent-loss effects that occur in PMD compensator 425, and a reduction in the required dynamic range of the control circuitry for the automatic polarization transformers are among the advantages obtained from the inventive features described above.

The foregoing is merely illustrative of the principles of the invention. Those skilled in the art will be able to devise numerous arrangements, which, although not explicitly shown or described herein, nevertheless embody those principles that are within the spirit and scope of the invention. For example, based on the foregoing, it would be obvious to the skilled practitioner that the effects of still higher-orders of PMD may be dealt with by merely expanding the compensator, e.g., compensator 425, to include additional sections of high-birefringence fibers and polarization transformers, as needed.

We claim:

1. A compensator for compensating for the effects of polarization mode dispersion occurring in an optical transmission fiber having principal states of polarization, the compensator comprising a polarization transformation element operative for reorienting the polarization of particular components of an optical signal received over the optical transmission fiber, apparatus operative for dividing a signal coupled to an output of the polarization transformation element into a predetermined number of signals each having a polarization state oriented orthogonally to a respective one of the two principal states of polarization and for delaying each such divided signal a variable amount of time; and analyzer means having an optical converter for converting a portion of a signal outputted by the apparatus into an electrical signal and having apparatus for splitting the converted signal into a plurality of signals and supplying the split signals to first, second and third analyzer sections, respectively, in which the first section operates to pass the entire spectrum of the outputted signal, the second section operates to pass only that portion of the entire spectrum that is below a predetermined frequency and the third section operates to pass a predetermined band of the entire spectrum, and wherein said distortion analyzer includes means for summing the outputs of the first and second sections and subtracting the output of the third section from the summed result to generate a distortion indicator and for supplying the distortion indicator to the polarization transformation element and said apparatus, and wherein said polarization transformation element and said apparatus, responsive to a change in the level of the distortion indicator, respectively changing until the level of the distortion indicator reaches a predetermined level, the orientation of each said polarization state and said variable amount of time.

2. The compensator of claim 1 wherein said first section comprises a broadband electrical power detector, the second section comprises a low-pass filter in series with a broadband electrical power detector, and the third section comprises a bandpass filter in series with a broadband electrical power detector.

3. The compensator of claim 1 wherein said compensator further comprises receiver means for processing said portion of the outputted signal to generate AC and DC components, for supplying the AC component to a splitter to generate said plurality of signals, for supplying the DC component to signal squaring means that squares the value of the DC component and comprises apparatus for dividing the value of the result of said subtraction by the value of the squared signals and outputting the quotient of such dividing as the distortion indicator.

4. A compensator for compensating for the effects of polarization mode dispersion occurring in an optical transmission fiber having principal states of polarization, the compensator comprising a polarization transformation element operative for reorienting the polarization of particular components of an optical signal received over the optical transmission fiber, apparatus operative for dividing a signal coupled to an output of the polarization transformation element into a predetermined number of signals each having a polarization state oriented orthogonally to a respective one of the two principal states of polarization and for delaying each such divided signal a variable amount of time; and receiver means having an optical converter for converting a portion of a signal outputted by the apparatus into a predetermined signal and generating AC and DC component signals from the converted signal and wherein said receiver supplies the AC component signal to a distortion analyzer that measures the level of at least first-order PMD distortion in the AC component and outputs a signal indicative of the level of such distortion and supplies the DC component to signal squaring means, and wherein said compensator further comprises divider means that divides the level of the signal indicative of said distortion by the level of the squared signal and supplies the resulting quotient signal as a distortion indicator to the polarization transformation element and said apparatus, and wherein said polarization transformation element and said apparatus, responsive to a change in the level of the distortion indicator, respectively change, until the level of the distortion indicator reaches a predetermined level, the orientation of each said polarization state and said variable amount of time.

5. The compensator of claim 4 wherein said distortion analyzer comprises apparatus for splitting the AC component into a plurality of signals and supplying the split signals to first, second and third analyzer sections, respectively, in which the first section operates to pass the entire spectrum of the outputted signal, the second section operates to pass only that portion of the entire spectrum that is below a predetermined frequency and the third section operates to pass a predetermined band of the entire spectrum, and wherein said distortion analyzer further comprises means for summing the outputs of the first and second sections and subtracting the output of the third section from the summed result and supplying the result of such subtraction as the numerator to said divider means.

6. The compensator of claim 5 wherein said first section comprises a broadband electrical power detector, the second section comprises a low-pass filter in series with a broadband electrical power detector, and the third section comprises a bandpass filter in series with a broadband electrical power detector.

7. The compensator of claim 4 wherein said distortion analyzer comprises apparatus for splitting the AC component into a plurality of signals and supplying the split signals to first and second sections in which the first section comprises a broadband electrical power detector, and said second section comprises a low-pass filter in series with a broadband electrical power detector, and said distortion analyzer further comprises an adder circuit for combining the outputs of the first and second sections and supplying the summed signal to the divider means.

8. The compensator of claim 4 wherein said distortion indicator is a feedback voltage.

9. A compensator for compensating for the effects of polarization mode dispersion occurring in an optical transmission fiber having principal states of polarization, the compensator comprising a polarization transformer configured to reorient the polarization of particular components of an optical signal received over the optical transmission fiber, a variable birefringence element (VBE) configured to divide a signal coupled to an output of the polarization transformer into a predetermined number of signals each having a polarization state oriented orthogonally to a respective one of the two principal states of polarization and to delay each such divided signal a variable amount of time; and a distortion analyzer having a photodetector configured to convert a portion of a signal outputted by the VBE into an electrical signal and having a splitter configured to split the converted signal into a plurality of signals and supply the split signals to first, second and third analyzer sections, respectively, in which the first section operates to pass the entire spectrum of the outputted signal, the second section operates to pass only that portion of the entire spectrum that is below a predetermined frequency and the third section operates to pass a predetermined band of the entire spectrum, and wherein said distortion analyzer includes a summing circuit configured to sum the outputs of the first and second sections and subtract the output of the third section from the summed result to generate a distortion indicator and to supply the distortion indicator to the polarization transformer and said VBE, and wherein said polarization transformer and said VBE, responsive to a change in the level of the distortion indicator, respectively changing until the level of the distortion indicator reaches a predetermined level, the orientation of each said polarization state and said variable amount of time.

10. The compensator of claim 9 wherein said first section comprises a broadband electrical power detector, the second section comprises a low-pass filter in series with a broadband electrical power detector, and the third section comprises a bandpass filter in series with a broadband electrical power detector.

11. The compensator of claim 9 wherein said compensator further comprises a frequency splitter configured to process said portion of the outputted signal to generate AC and DC components, to supply the AC component to the splitter to generate said plurality of signals, and to supply the DC component to a squaring circuit configured to square the value of the DC component, and a divider configured to divide the value of the result of said subtraction by the value of the squared signals and outputting the quotient of such dividing as the distortion indicator.

12. The compensator of claim 9 wherein said VBE comprises a second polarization transformer configured between two birefringence fibers.

13. A compensator for compensating for the effects of polarization mode dispersion occurring in an optical transmission fiber having principal states of polarization, the compensator comprising a polarization transformer configured to reorient the polarization of particular components of an optical signal received over the optical transmission fiber, a variable birefringence element (VBE) configured to divide a signal coupled to an output of the polarization transformation element into a predetermined number of signals each having a polarization state oriented orthogonally to a respective one of the two principal states of polarization and to delay each such divided signal a variable amount of time, a photodetector configured to convert a portion of a signal outputted by the VBE into a predetermined signal, a frequency splitter configured to generate AC and DC component signals from the converted signal, wherein said frequency splitter supplies the AC component signal to a distortion analyzer that measures the level of at least first-order PMD distortion in the AC component and outputs a signal indicative of the level of such distortion and supplies the DC component to a squaring circuit, and a divider configured to divide the level of the signal indicative of said distortion by the level of the squared signal and supply the resulting quotient signal as a distortion indicator to the polarization transformer and said VBE, and wherein said polarization transformer and said VBE, responsive to a change in the level of the distortion indicator, respectively change, until the level of the distortion indicator reaches a predetermined level, the orientation of each said polarization state and said variable amount of time.

14. The compensator of claim 13 wherein said distortion analyzer comprises a splitter configured to split the AC component into a plurality of signals and supply the split signals to first, second and third analyzer sections, respectively, in which the first section operates to pass the entire spectrum of the outputted signal, the second section operates to pass only that portion of the entire spectrum that is below a predetermined frequency and the third section operates to pass a predetermined band of the entire spectrum, and wherein said distortion analyzer further comprises a summing circuit configured to sum the outputs of the first and second sections and subtract the output of the third section from the summed result and supplying the result of such subtraction as the numerator to said divider.

15. The compensator of claim 14 wherein said first section comprises a broadband electrical power detector, the second section comprises a low-pass filter in series with a broadband electrical power detector, and the third section comprises a bandpass filter in series with a broadband electrical power detector.

16. The compensator of claim 13 wherein said distortion analyzer comprises a splitter configured to split the AC component into a plurality of signals and supplying the split signals to first and second sections in which the first section comprises a broadband electrical power detector, and said second section comprises a low-pass filter in series with a broadband electrical power detector, and said distortion analyzer further comprises an adder circuit configured to combine the outputs of the first and second sections and supply the summed signal to the divider.

17. The compensator of claim 13 wherein said distortion indicator is a feedback voltage.

18. The compensator of claim 13 wherein said VBE comprises a second polarization transformer configured between two birefringence fibers.

* * * * *